United States Patent Office 3,275,585
Patented Sept. 27, 1966

3,275,585
ASPHALT-CONTAINING COMPOSITIONS AND METHOD FOR THEIR PREPARATION
Lester A. H. Baum, Cherry Hill, N.J., and Paul F. Bruins, Douglaston, and Leonard Henschel, Flushing, N.Y., assignors to Mobil Oil Corporation, a corporation of New York
No Drawing. Filed June 15, 1964, Ser. No. 375,315
11 Claims. (Cl. 260—28)

This invention relates to new and useful asphalt-containing compositions, and relates more particularly to improved petroleum asphalt compositions, having a wide variety of useful properties, and to the method for their preparation; and the present application is a continuation-in-part of our copending application Serial No. 197,899, filed May 28, 1962, now abandoned.

Raw asphalt is, generally, commercially produced in the form of heavy bottoms obtained by the prior removal of the distillate portion of naphthenic or mixed base crudes. This raw asphalt, as obtained from the crude still, is exceedingly tough and flexible and can be used in various applications such as a binding agent in combination with other materials, or as a paving material, and also as a coating material. A problem encountered in the use of raw asphalt for these purposes is the characteristic of this material to soften at rising temperatures and even to melt, in many instances, at relatively low temperatures, for example, from about 80° F. to about 100° F., thus rendering it unsuitable for its intended use.

The aforementioned characteristic defects of raw asphaltic materials are well known to the art. It has been the practice, heretofore, to treat asphalt for the purpose of obtaining a material which is better able to withstand the deleterious effect of elevated temperatures. Conventional treatment, for this purpose, involves blowing heated asphalt with air in a tank maintained at elevated temperature. This blowing treatment is conducted for long periods of time until the asphalt has been oxidized to form a more heat-resistant product. Thus, for example, in practice a Kuwait asphalt, having a softening point of 85° F. by the standard Ring & Ball Test, can be air-blown at elevated temperature to produce a product having a ring and ball softening point of 240° F. Such air-blown asphalt will show a standard penetration of 8 at 77° F., 100 grams/5 seconds, a ductility of 0 at 77° F. and a solubility in carbon tetrachloride of about 99.5%.

The air-blowing of asphalt requires the use of bulky expensive equipment for long periods of time, and, must be carefully supervised over this lengthly period of treatment, and the treatment cannot be conducted outside the treating vessel. Furthermore, the penetration of air-blown asphalt is not sufficiently high for the many possible uses of this material.

It is, therefore, an object of the present invention to provide new and useful asphalt-containing compositions.

Another object of the invention is to provide new and useful asphalt-containing compositions having improved Ring & Ball Softening Points.

Still another object of the invention is to provide a new and improved method for obtaining the aforementioned asphalt-containing compositions.

Other objects and advantages inherent in the invention will become apparent to those skilled in the art from the following detailed description.

In accordance with the present invention, there are provided new and useful asphalt-containing compositions having improved Ring & Ball Softening Points, and which can be prepared at a significantly faster rate than heretofore compositions. These improved asphalt-containing compositions possess wide utility and are particularly useful in molding compounds for the manufacture of rods, pipes, sheets and other shaped articles. They are also useful in the impregnation of porous bodies such as wood, plaster of Paris or porous graphite parts and sintered metal moldings. They can be employed as coatings, for paving materials and other surfaces, or as seal-coatings. Furthermore, they can be used as binders in the manufacture of laminates and in combination with cellulosic particles, such as fibers, chips, shavings, sheets and similar materials derived from various forms of plants and trees. In one of its more specific aspects of utility these novel asphaltic compositions are useful in the manufacture of bonded wood products such as particle board laminates, fiber board, plywood and chip board. Boards manufactured employing the binders of this invention, may also contain other fibers such as fiberglass asbestos, cotton and various other similarly related fiber materials.

The improved compositions of the present invention, as more fully hereinafter described, are prepared, in general, by reacting a major proportion of a petroleum asphalt with a minor proportion of an aldehyde in the presence of an acidic catalyst at a temperature sufficiently high to effect condensation between the asphalt and the aldehyde. In this respect, it is known to those skilled in the art that asphalts and aldehydes can be reacted at elevated temperature to up-grade the low melting point asphalts to asphalts of higher melting points. However, in such practice it has been found that the resulting asphaltic compositions are relatively hard, brittle, and comparatively rigid in structure. On the other hand, the treatment of a petroleum asphalt with an aldehyde in the presence of an acidic catalyst at a sufficient elevated temperature results in effecting a condensation reaction between the asphalt and the aldehyde, unlike the processes of the prior art, and thus results in obtaining an improved asphaltic composition which is relatively flexible, and soft, even though it has an elevated ring and bell softening point. These improved properties of flexibility and softness, make these compositions particularly useful in the manufacture of the above-described products. Thus, the asphaltic compositions produced in accordance with conventional processes, are clearly distinct from the novel and significantly improved asphaltic compositions of the present invention.

With respect to the preparation of the improved asphaltic compositions of the present invention, the petroleum asphalt employed as the reactant with the aldehyde may comprise a virgin asphalt obtained by removing the distillate from a naphthenic base crude oil, or can, alternatively, comprise a cracked asphalt obtained from the thermal or catalytic cracking of heavy stocks to produce light materials, such as gasoline and fuel oil. An asphalt residue, is also obtained in the aforementioned cracking process which adequately serves as the petroleum asphalt in the aforementioned mixtures employed for the production of the improved asphaltic compositions. Heavy petroleum fractions comprising highly aromatic petroleum hydrocarbons may also be employed for this purpose. Thermal asphalt and other high-boiling fractions may be utilized, such as straight-run asphalts, heavy thermal gas oil, tar separator bottoms, syn-tower bottoms, coker charge-stocks, coker blown-down liquids, and the entire residuum from vacuum distillation of crude petroleum.

The aldehyde reactant, employed in making the novel improved asphaltic compositions of the present invention may comprise, in general, any compound having an active $$-\overset{\overset{\displaystyle H}{|}}{C}=O$$

group characteristic of aldehydes. Contemplated herein are the aliphatic aldehydes and the aromatic aldehydes, including heterocyclic aldehydes. Non-limiting examples of the aldehydes include formaldehyde, acetaldehyde, propionaldehydes, butyraldehyde, acrolein, crotonaldehyde, tiglaldehyde, benzaldehyde, salicylaldehyde, cinnamaldehyde, and furfural. With respect to the use of the aforementioned aldehydes, they may also be employed in their polymeric forms, for example, paraformaldehyde, and polymeric forms of any of the aforementioned aldehydes. It should also be noted, if so desired, that the aldehyde reactant may comprise mixtures of aldehydes and aldehyde polymers.

In general, the amount of aldehyde component employed, based upon the weight of the petroleum asphalt present, can from a practical standpoint, vary between about 1% and about 25%, and preferably between about 5% and about 15%. As previously indicated, in order to effect condensation between the asphalt and the aldehyde, the presence of an acidic catalyst is required during heat treatment. Suitable acidic catalyst include sulfuric acid, toluene sulfonic acid, paratoluene sulfonic acid, the acidic residue from the sulfuric acid refining of tall oil, hydrochloric acid, phosphoric acid, and other strong mineral acids. The acidic catalyst may also include salts of any of the aforementioned acids. In general, however, the acidic catalyst should have a pH value which is not higher than about 4, inasmuch as the use of an acidic catalyst whose pH value is substantially above 4, has the effect of the acidic material ceasing to function as a catalyst, with the further result that a condensation reaction between the asphalt and the aldehyde cannot take place.

The amount of catalyst employed, based upon the weight of the petroleum asphalt present, will, in general, vary between about 0.1% and about 5%, and preferably between about 0.1% and about 2%. The reaction between the petroleum asphalt and the aldehyde, in the presence of the acidic catalyst, is carried out at a temperature which is sufficiently high to effect condensation between the asphalt and the aldehyde. For this purpose, temperatures within the range from about 150° F. to about 600° F. may be employed, and, in many instances, preferably within the range from about 185° F. to about 400° F. The time of reaction will vary inversely with the temperature and may be carried out over a period varying from about 5 minutes to as high as about 6 hours. The reaction can also be carried out at superatmospheric pressures. When such elevated pressures are employed, higher temperatures and shorter reaction times can also be employed.

The reaction involved in preparing the compositions of the present invention for use as binders, can be carried out in several ways. The binders, for example, can be prepared by reacting the petroleum asphalt and the aldehyde, in the presence of the acidic catalyst, in the manner previously described. The resulting compositions can be applied to such materials as cellulosic materials, and, thereafter, boards can be formed therefrom by molding under heat and pressure. The binder can be readily applied to the cellulosic material in the form of an aqueous suspension. Alternatively, the petroleum asphalt and the aldehyde reactants and the catalyst can be applied to the cellulosic material, and this material can then be molded under heat and pressure to form the binder in situ. As has been hereinbefore mentioned, the bonded products of the present invention may include particle board and plywood. These products are all prepared by the same general method of covering the surface of the cellulosic material with the binder, or with the reactants to form the binder in situ, and then heating under pressure. Particle board is prepared from various particles manufactured for such use, but may also include wood particles obtained as waste in sawmills, lumber yards, or carpentry shops. Such waste particles include sawdust, chips and shavings. Waste ends can also be used if they are comminuted to particulate form.

Wood particles coated with the binders, or with the aforementioned reactants to produce the binder, in situ, are placed in a molding press of desired size and shape, and then subjected to heat and pressure. The compactness and hardness of the product particle wood is governed to a great extent by the amount of pressure used.

In general, pressures from about 50 p.s.i.g. up to about 800 p.s.i.g. can be employed from a practical standpoint. The molding temperature, as previously indicated, may vary from about 150 to about 600° F., however, in a specific instance, molding should not be carried out at temperatures at which charring of the cellulosic material might occur. The molding time will be dependent upon the temperature and the flow characteristic of the prepared binder. Sufficient time must be allowed, to permit even flow, in order to provide boards of reasonable uniformity. When forming the binder in situ, the molding time is correlated with the temperature, as previously indicated.

Plywoods are formed by coating the surfaces of thin sheets of wood with the binders, or with the reactants to produce the binder in situ, as previously described. The coated wood sheets are then stacked one on top of another to the desired thickness, usually with the direction of the grain of adjacent sheets oriented at right angles. The stack of sheets or plies is then heated under pressure, as was discussed above in connection with particle boards. The amount of binder, or binder reactants, that is applied to the cellulosic material to form the particle boards or ply boards, is such that the finished board, will contain, by weight, between about 5% and about 30% of the binder.

With respect to further utility of the novel asphaltic compositions of the present invention, it has been found that bituminous pavements are not practical in locations where gasoline and jet fuel spillage, or high temperature exhausts from jet engines are encountered. However, surfaces treated with the novel compositions of the present invention, provide an acceptable surface layer or coating, which is resistant to gasoline jet fuel and heat from jet engine exhaust screens.

The following examples will serve to illustrate the preparation of the aforementioned novel and improved asphaltic compositions of the present invention, and to demonstrate their utility and effectiveness as evidenced by the respective softening points and other characteristic data obtained.

In one specific embodiment of the asphaltic compositions produced in accordance with the present invention, mixtures comprising from about 4 to about 10%, by weight, of furfural or furfural polymers and from about 90 to about 96%, by weight, of a petroleum asphalt, are subjected to treatment at a temperature from about 185 to about 400° F. for a period of from about 1 to about 6 hours in the presence of from about 1 to about 6%, by weight, of an acidic catalyst, as previously described. During this treatment the softening point of the asphalt increases about 100° F., and forms a "B" stage resin which can be processed and formed. A second treatment can then be given to the resin, with an additional catalyst being present in an amount up to 5%, by weight, of the resin, and further heated to convert the asphalt to an infusible and insoluble material. This additional catalyst may be selected from the group consisting of sulfuric acid, prosphoric acid and boron fluoride etherate. The final treatment is then conducted at a temperature from about 300° F. to about 400° F. for an additional period of about ¼ to about 2 hours, whereon the product is further raised in softening point and solvent-resistance.

The production of the aforementioned specific compositions are illustrated by the following examples.

*Example 1*

90 grams of Kuwait asphalt (85° F. softening point, R. & B.) were heated to 180° F., and 1 gram of sulfuric acid was slowy added with stirring. This mixture was held for a period of 30 minutes at 180° F., with stirring. Thereafter 10 grams of furfural were added and the temperature was raised to 340° F., as the product began to harden, after a total reaction time of 6 hours, the mixture was cooled and the product was tested. It was found that this product was a smooth homogeneous asphalt with a softening point of 230° F. R. & B., and a penetration @ 77/100/5 of 76.

*Example 2*

264 grams of Kuwait asphalt (85° F. softening point, R. & B.) were heated to 185° F. 30 grams of furfural were then slowly added with stirring for a period of 45 minutes. 6 grams of paratoluene sulfonic acid were slowly added and heating was continued for 3 hours. 10 grams of paratoluene sulfonic acid were then added and the mixture was maintained at 245° F. for a period of 3 hours. The temperature was then increased during a 5 hour period to 340° F. The test results of the asphalt-furfural composition are compared with test results of a conventional blown asphalt in the following table.

TABLE I

|  | Untreated Asphalt | Conventionally Blown Asphalt | Furfural-Asphalt |
|---|---|---|---|
| Softening Point (R. & B.) °F | 85 | 226 | 226 |
| Penetration, 77° F./100 g./5 sec | | 18 | 47 |
| Ductility at 77° F | | 3 | 3 |
| Solubility in CCl₄ | 99 | 99 | 87 |
| Barber Stain | 4 | 4 | 8 |

It will be noted from Table I of Example 2 that when the product of this invention is processed to an equivalent softening point of 226° F. as a blown asphalt, the product of this invention has a remarkably high penetration value of 47, as compared to 18 for the conventionally blown asphalt. This denotes a rubbery tough type of material, as compared to the usually hard and brittle blown product. This furfural-asphalt material, as demonstrated above, has characteristics which make it especially suitable for culvert pipe coatings.

*Example 3*

(1) A blend was prepared comprising 70% furfural and 30% furfural butadiene tar copolymer by weight.

(2) A blend was prepared comprising 80 grams of Kuwait asphalt (160° F. softening point, R. & B.) and 20 grams of the blend prepared in step (1). The temperature of this blend was raised to 260° F. and was stirred for 30 minutes.

(3) 6 grams of paratoluene sulfonic acid were dissolved in 10 cc. methylethyl ketone.

(4) The material prepared in step (3) was added to 94 grams of Kuwait asphalt (160° F. softening point, R. & B.), and the resulting blend was mixed at a temperature of 220° F. for a period of 15 minutes.

(5) The material from step (4) was gradually added to the material prepared in step (2), and the temperature was raised to 340–360° F. during a 3-hour period. This mixture was then held at 340–360° F. for an additional period of 2-hours.

The finished product from the above-described procedure, was found to comprise a homogeneous asphaltic material having an R. & B. softening point of 240° F. This method of adding the furfural and the paratoluene sulfonic acid separately to the asphalt is found to be desirable with some asphalts in order to prevent the formation of insoluble asphalt lumps.

*Example 4*

(1) 2016 grams of Kuwait asphalt (85° F. softening point R. & B.) were heated to 200° F., and thereafter were added 454 grams of furfural.

(2) Another 2016 grams of Kuwait asphalt (85° F. softening point, R. & B.) were heated to 200° F., and thereafter was added 135 grams of a 50% solution of paratoluene sulfonic acid in methylethyl ketone.

(3) The materials from steps (1) and (2) were combined and the temperature of the resulting mixture was held at 200° F. for a period of 3 hours.

(4) The temperature of the resulting material was then raised to 300° F. during a period of 30 minutes.

(5) The temperature of this resulting material was then held at 300° F. for an additonal period of 2 hours. This material was found to have a softening point of 215° F.

(6) A solution of 60%, by weight, of the material of step (5) and 40%, by weight, of xylene, was prepared.

(7) A solution was then prepared comprising 100 cc. of the material of step (6) and 4 cc. of 50% sulfuric acid. The material thus formed was found to be stable for periods of more than 7 days but when spread out in a thin film on a hot plate at 300° F., it became thermoset in 15 minutes. The material remained soft but did not flow at 300° F. This thermosetting property is found to be exceedingly useful in many practical applications.

*Example 5*

A blend was prepared, in the following manner, comprising 89%, by weight, of a straight-run asphalt (100/110° F. softening point, R. & B.), 8%, by weight, furfural, and 3%, by weight, of paratoluene sulfonic acid (dissolved in an equal amount of methylethyl ketone, as a solvent).

(1) One-half of the asphalt was heated to 200° F. and stirred with a high shear mixer (Cowles dissolver @ 1900 r.p.m.) while slowly adding the paratoluene sulfonic acid during a 20-minute period at 140° F. During this period the methylethyl ketone evaporated.

(2) The remainder of the asphalt was heated to 200° F., and similarly stirred while slowly adding the fururall during the 20-minute period.

(3) The materials from steps (1) and (2) were mixed at 200° F. during a 15-minute period.

(4) The exothermic reaction which occurred during the mixing, raised the temperature but also increased the viscosity of the materials. Additional heat was added in to maintain fluidity. The heating time, resulting temperature and R. & B. softening points are shown in Table II below.

TABLE II

| Time, hours | Temp., °F. | R. & B. Softening Point, °F. |
|---|---|---|
| 0 | 200 | |
| 0.25 | 240 | |
| 1.0 | 280 | |
| 1.25 | 295 | 167 |
| 2.0 | 320 | |
| 2.25 | 340 | 210 |
| 2.5 | 350 | 217 |
| 24 | 350 | 223 |
| 48 | 350 | 226 |
| 120 | 350 | 226 |

Other properties of the final product are:

Specific gravity _____ 0.9942
Penetration:
    @ 77/100/5 _____ 30
    @ 32/200/60 _____ 17
    @ 115/50/5 _____ 48
Solubility $CS_2$, percent _____ 97.07
Barber stain _____ 7
Visc. furol @ 350° F. _____ 4,077

*Example 6*

A blend was prepared, in the following manner comprising 89%, by weight, of a straight-run asphalt (100/110° F. softening point, R. & B.) 8%, by weight, furfural and 3%, by weight, the acidic residue from the sulfuric acid refining of tall oil.

(1) The asphalt was heated to 220° F., and stirred with a high shear mixer (Cowles dissolver at 1900 r.p.m.).

The furfural was slowly added during a 15-minute period.

(2) The acid catalyst was slowly added over a 10-minute period while continuing the high shear mixing, and the temperature was elevated to 230° F.

(3) The exothermic reaction raised the temperature, but some additional heating was required to maintain fluidity as the reaction proceeded. The heating time, resulting temperature, and R. & B. softening points are shown in Table III below.

TABLE III

| Time, hours | Temp., ° F. | R. & B. Softening Point, ° F. |
|---|---|---|
| 0 | 230 | |
| 0.16 | 240 | |
| 0.45 | 265 | |
| 0.66 | 280 | |
| 1.0 | 300 | 201 |
| 1.66 | 335 | 219 |
| 2.00 | 350 | 222 |
| 2.50 | 355 | 222 |

The properties of the final product are as follows:

Specific gravity _____ 0.9833
Penetration:
 @ 77/100/5 _____ 39
 @ 32/200/60 _____ 23½
 @ 115/50/5 _____ 63
Furol viscosity @ 350° F. _____ 767

*Example 7*

A blend was prepared, comprising 89%, by weight, of a straight-run asphalt (140° F. softening point, R. & B.), 8%, by weight, furfural and 3%, by weight, of the acidic residue from the sulfuric acid refining of tall oil. The procedure followed during blending was the same as for Example 6 above. The heating time, resulting temperature, and R. & B., softening points are shown in Table IV below.

TABLE IV

| Time, hours | Temp., ° F. | R. & B. Softening Point, ° F. |
|---|---|---|
| 0 | 230 | |
| 0.25 | 280 | |
| 0.5 | 290 | |
| 0.75 | 320 | 222 |
| 1.0 | 340 | 247 |
| 1.25 | 350 | 245 |
| 1.50 | 355 | 248 |

The properties of the final product are as follows:

Specific gravity _____ 0.9832
Penetration:
 @ 77/100/5 _____ 10
 @ 32/200/60 _____ 7
 @ 115/50/5 _____ 18½

*Example 8*

A mixture was prepared comprising 93%, by weight, of straight-run asphalt (140° F. softening point, R. & B.), 4%, by weight, furfural and 3%, by weight, of the acidic residue from the sulfuric acid refining of tall oil. The procedure followed was the same as described in Example 6.

The heating time, resulting temperature, and R. & B., softening points of the products are shown in Table V below.

TABLE V

| Time, hours | Temp., ° F. | R. & B. Softening Point, ° F. |
|---|---|---|
| 0 | 240 | |
| 0.5 | 295 | |
| 0.75 | 320 | 222 |
| 1.00 | 345 | 232 |
| 1.25 | 350 | 245 |
| 1.5 | 350 | 245 |

The properties of the finished product are as follows:

Specific gravity _____ 0.9860
Penetration:
 @ 77/100/5 _____ 14½
 @ 32/200/9 _____ 9
 @ 115/50/5 _____ 27

*Example 9*

A mixture was prepared comprising 93%, by weight, of thermal asphalt (170° F. R. & B., softening point), 4%, by weight of furfural and 3%, by weight, of the acidic residue from the sulfuric acid refining of tall oil. The procedure followed was the same as described in Example 6.

The heating time, resulting temperature, and R. & B., softening point, are shown in Table VI below.

TABLE VI

| Time, hours | Temp., ° F. | R. & B. Softening Point, ° F. |
|---|---|---|
| 0 | 230 | |
| 0.5 | 280 | |
| 0.75 | 310 | |
| 1.0 | 340 | |
| 1.25 | 350 | 183 |
| 1.75 | 360 | |
| 2.25 | 375 | 204 |
| 2.75 | 400 | 218 |

The properties of the finished material are as follows:

Specific gravity _____ 1.185
Penetration:
 @ 140/100/5 _____ 10
 @ 150/100/5 _____ 19½
 @ 160/100/5 _____ 29½

Examples 1 through 8 demonstrate that straight-run asphalt can be copolymerized with furfural by the use of cationic catalysts, such as sulfuric acid or the acidic residue from the sulfuric acid refining of tall oil with resulting increases in softening points of more than 100° F. The copolymerization is demonstrated by the rapid rise in the melt viscosity. Example 9 demonstrates that a thermally cracked asphalt which has previously been subjected to high temperatures, also shows a corresponding reaction with furfural in the presence of the selected catalyst. Thermally cracked asphalts which have been stripped of lower boiling fractions so as to raise the softening point to as high as 170° F., still show reactivity with furfural, but in decreasing amounts as the softening point is raised.

In another aspect of the present invention, it was found that when the petroleum asphalt and the aldehyde are heated to temperatures towards the upper limits of the aforementioned temperature range, viz., within the range of about 400 to about 600° F., the resulting improved asphaltic compositions possess elevated softening points (R. & B.) from about 290° F. to about 350° F., and the reaction proceeds at a rapid rate to the point where this range of softening points is attained.

The following examples will serve to illustrate the novel asphaltic compositions prepared within the aforementioned relatively higher temperature range.

Example 10

The following compound was prepared, comprising, by weight, 87% of a straight-run asphalt (100/110° F. softening point, R. & B.), 10% furfural (technical grade), and 3% toluene sulfonic acid (technical grade), as a catalyst.

The asphalt was heated to a temperature of 220° F. and stirred with a high shear mixer (Cowles dissolver) at 1900 r.p.m. The furfural was slowly added during a 15 minute period. The toluene sulfonic acid catalyst was then slowly added over a 10 minute period, while continuing the high shear mixing with the temperature elevated to 230° F. It was found that the exothermic reaction raised the temperature, but that additional heat was required to maintain fluidity as the reaction proceeded. The heating time and resulting temperature and R. & B. softening point data, are as follows.

| Time, hours | Temp., ° F. | R. & B. Softening Point, ° F. |
|---|---|---|
| 0 | 228 | |
| 0.42 | 262 | |
| 0.66 | 275 | 140 |
| 1.0 | 300 | |
| 1.42 | 340 | 161 |
| 1.66 | 355 | 215 |
| 2.42 | 380 | 225 |
| 3.66 | 425 | 270 |
| 4.66 | 422 | 290 |
| 5.16 | 425 | 298 |

The properties of the final asphaltic product thus obtained, are as follows:

Specific gravity 77/77° F. _____ 1.012
Softening point (R. & B.), ° F. _____ 298
Penetration:
    @ 32° F./200 g./60 sec. _____ 23
    @ 77° F./100 g./5 sec. _____ 36
    @ 115° F./50 g./5 sec. _____ 51
Solubility $CS_2$, percent wt. _____ 67.3
Furol viscosity @ 400, sec. _____ 8000
Flashpoint COC, ° F. _____ 560
Ductility @ 77° F., cm. _____ 2½
Barber stain No. _____ 7

Example 11

Employing the same straight-run asphalt, furfural and toluene sulfonic acid as described in Example 10, and in similar amounts, and following the same procedure, the heating time and resulting temperature and R. & B. softening point data, of the asphaltic composition, were obtained, as follows:

| Time, hours | Temp., ° F. | R. & B. Softening Point, ° F. |
|---|---|---|
| 0 | 225 | |
| 0.33 | 290 | |
| 0.75 | 335 | |
| 1.00 | 360 | |
| 1.25 | 400 | |
| 1.50 | 440 | |
| 2.00 | 510 | 347 |
| 2.50 | 520 | 347 |
| 3.00 | 520 | 345 |

The properties of the final asphaltic product thus obtained, are as follows.

Specific gravity 77/77° F. _____ 1.011
Softening point (R. & B.), ° F. _____ 345
Penetration:
    @ 32° F./200 g./60 sec. _____ 20
    @ 77° F./100 g./5 sec. _____ 28
    @ 115° F./50 g./5 sec. _____ 43
Furol viscosity @ 400° F., sec. _____ 12,400
Flashpoint, COC, ° F. _____ 560
Ductility @ 77° F., cm. _____ 2½
Barber stain No. _____ 7

Example 12

The following compound was prepared comprising by weight, 87% of a straight-run asphalt (100/110° F. R. & B. softening point), 10% furfural (technical grade), and 3% of the acidic residue from the sulfuric acid refining of tall oil, as a catalyst.

Following the same procedure as described in Example 10, the heating time and resulting temperature and R. & B. softening point data, of the asphaltic composition, were obtained as follows.

| Time, hours | Temp., ° F. | R. & B. Softening Point, ° F. |
|---|---|---|
| 0 | 225 | |
| 0.5 | 250 | |
| 1.0 | 285 | |
| 1.5 | 340 | |
| 2.0 | 440 | |
| 2.5 | 500 | 265 |
| 3.0 | 500 | 301 |
| 3.5 | 500 | 311 |

The properties of the final asphaltic product thus obtained, are shown as follows.

Specific gravity _____ 0.9848
Softening point (R. & B.), ° F. _____ 311
Penetration:
    @ 32° F./200 g./60 sec. _____ 11
    @ 77° F./100 g./5 sec. _____ 14
    @ 115° F./50 g./5 sec. _____ 21
Furol viscosity @ 400° F., sec. _____ 19,564
Flashpoint, COC, ° F. _____ 580
Ductility @ 77° F., cm. _____ 1½
Barber stain No. _____ 7

By repeating the procedure described in the above examples, and under similar operating conditions, various other petroleum asphalts, such as thus previously disclosed, can be substituted for the straight-run asphalts employed therein. In a similar manner, other furfural copolymers can be successfully employed in the manner described. This is also applicable to mixtures comprising any combination of furfural and the aforementioned furfural copolymer. Furthermore, other ionic catalysts, such as sulfuric acid or paratoluene sulfonic acid can be successfully employed in place of toluene sulfonic acid or the acidic residue obtained from the sulfuric acid refining of tall oil, as shown in the aforementioned examples. In each instance, improved asphaltic compositions of elevated R. & B. softening points can be obtained.

Example 13

100 grams of thermal asphalt and 1 gram of 96.4% sulfuric acid were heated to reflux temperature (220–240° F.) in acetic acid (150 cc.), and dioxane (150 cc.). While stirring, a total of 11 grams of paraformaldehyde were added in several small batches. In this mixture the acetic acid functioned as a solvent for the paraformaldehyde, and the dioxane functioned as a co-solvent for the asphalt. After a few minutes a solid asphaltic material precipitated and the reaction was permitted to proceed for 2 hours, after which time the products were cooled and the acetic acid phase was poured off. After water-washing and drying, this modified asphalt presented a light yellow color when painted. This material was found to be partially insoluble in benzene and could be melted.

Although the present invention has been described with preferred embodiments, it will be understood that various modifications and adaptations thereof may be resorted to, without departing from the spirit and scope of the invention, as those skilled in the art will readily appreciate.

We claim:

1. An improved asphaltic composition obtained by reacting a major proportion of a petroleum asphalt with a minor proportion of an aldehyde in the presence of a catalyst selected from the group consisting of toluene sulfonic acid, paratoluene sulfonic acid and the acidic residue from the sulfuric acid refining of tall oil at a temperature sufficient to effect condensation between said asphalt and said aldehyde.

2. An improved asphaltic composition obtained by reacting a major proportion of a petroleum asphalt with a minor proportion of an aldehyde, in the presence of a catalyst selected from the group consisting of toluene sulfonic acid, paratoluene sulfonic acid and the acidic residue from the sulfuric acid refining of tall oil, at a temperature from about 150° F. to about 600° F.

3. An improved asphaltic composition obtained by reacting a major proportion of a petroleum asphalt with a minor proportion of at least one aldehyde selected from the group consisting of furfural and furfural polymers, in the presence of a catalyst selected from the group consisting of toluene sulfonic acid, paratoluene sulfonic acid and the acidic residue from the sulfuric acid refining of tall oil, at a temperature from about 150° F. to about 600° F.

4. A paving material coated with the composition defined by claim 1.

5. The method of preparing an asphaltic composition which comprises: preparing a mixture comprising a major proportion of a petroleum asphalt and a minor proportion of an aldehyde; and heating said mixture in the presence of a catalyst selected from the group consisting of toluene sulfonic acid, paratoluene sulfonic acid and the acidic residue from the sulfuric acid refining of tall oil at a temperature sufficient to effect condensation between said asphalt and said aldehyde.

6. The method of preparing an asphaltic composition which comprises: preparing a mixture comprising a major proportion of a petroleum asphalt and a minor proportion of an aldehyde; and heating said mixture in the presence of a catalyst selected from the group consisting of toluene sulfonic acid, paratoluene sulfonic acid and the acidic residue from the sulfuric acid refining of tall oil, at a temperature from about 150° F. to about 600° F.

7. The method of preparing an asphaltic composition which comprises: preparing a mixture comprising a major proportion of a petroleum asphalt and a minor proportion of at least one aldehyde selected from the group consisting of furfural and furfural polymers; and heating said mixture in the presence of a catalyst selected from the group consisting of toluene sulfonic acid, paratoluene sulfonic acid and the acidic residue from the sulfuric acid refining of tall oil, at a temperature from about 150° to about 600° F.

8. A composition comprising about 4–10%, by weight of a material selected from the group consisting of furfural and furfural polymers and about 90–96%, by weight, of a petroleum asphalt, in the form of a thermosetting polymer obtained by subjecting the commingled material to a treatment at a temperature of 185–400° F. for a period of 1–6 hours, in the presence of a catalyst in the amount of 1–6%, by weight, and selected from the group consisting of toluene sulfonic acid, paratoluene sulfonic acid and the acidic residue from the sulfuric acid refining of tall oil, whereby an asphaltic polymer is obtained having improved thermosetting properties and a substantially elevated R. & B. softening point.

9. The composition of claim 8 further characterized in that said composition following the aforementioned treatment is commingled with a catalyst selected from the group consisting of phosphoric acid and boron fluoride etherate in the amount of up to 5%, by weight, of the final mixture and is treated for an additional treatment time of ¼ to 2 hours at a temperature of 300° F. to 400° F. whereby the product is further raised in softening point and solvent resistance.

10. The method of producing a thermosetting composition having an elevated R. & B. softening point which comprises the steps of mixing about 4–10%, by weight, of a material selected from the group consisting of furfural and furfural polymers, about 90–96%, by weight, of a petroleum asphalt and about 1–6%, by weight of a catalyst selected from the group consisting of toluene sulfonic acid, paratoluene sulfonic acid and the acidic acid residue from the sulfuric acid refining of tall oil, maintaining the mixture at a temperature of about 185–400° F. for a period of 1–6 hours, whereby an asphaltic polymer is obtained having thermosetting properties and a substantially elevated R. & B. softening point as compared to the original petroleum asphalt.

11. The method of claim 10 further characterized in that the composition following the aforementioned treatment is commingled with up to 5%, by weight, of a catalyst selected from the group consisting of sulfuric acid, phosphoric acid and boron fluoride etherate, heating the mixture for an additional time period of ¼ to 2 hours at a temperature of 300 to 400° F. whereby the product is further raised in softening point and solvent resistance.

References Cited by the Examiner

UNITED STATES PATENTS

| | | | |
|---|---|---|---|
| 2,290,833 | 7/1942 | Keyser et al. | 161—237 |
| 2,314,181 | 3/1943 | Winterhorn | 260—28 |
| 2,612,445 | 9/1952 | Spence | 260—17.4 |
| 2,689,237 | 9/1954 | Seymour et al. | 260—28 |
| 2,764,523 | 9/1956 | Cottle et al. | 206—273 |
| 2,861,895 | 11/1958 | Hardman | 260—28 |

FOREIGN PATENTS 131,858   3/1949   Australia.

WILLIAM H. SHORT, *Primary Examiner.*

E. M. WOODBERRY, *Assistant Examiner.*

UNITED STATES PATENT OFFICE
CERTIFICATE OF CORRECTION

Patent No. 3,275,585　　　　　　　　　　　　September 27, 1966

Lester A. H. Baum et al.

It is hereby certified that error appears in the above numbered patent requiring correction and that the said Letters Patent should read as corrected below.

Column 1, line 68, after "heretofore" insert -- commercially prepared conventional asphalt-containing --.

Signed and sealed this 22nd day of August 1967.

(SEAL)
Attest:

ERNEST W. SWIDER　　　　　　　　　　　　EDWARD J. BRENNER
Attesting Officer　　　　　　　　　　　　　Commissioner of Patents